United States Patent
Dankbaar

(10) Patent No.: US 10,086,720 B2
(45) Date of Patent: Oct. 2, 2018

(54) SMA VALVE FOR CONTROLLING AIR SUPPLY TO AN AIR CELL IN A VEHICLE SEAT

(71) Applicant: Kongsberg Automotive AB, Mullsjoe (SE)

(72) Inventor: Frank Dankbaar, Mullsjö (SE)

(73) Assignee: Kongsberg Automotive AB, Mullsjö (SE)

( * ) Notice: Subject to any disclaimer, the term of this patent is extended or adjusted under 35 U.S.C. 154(b) by 0 days.

(21) Appl. No.: 15/104,112

(22) PCT Filed: Dec. 13, 2013

(86) PCT No.: PCT/EP2013/076593
§ 371 (c)(1),
(2) Date: Jun. 13, 2016

(87) PCT Pub. No.: WO2015/086094
PCT Pub. Date: Jun. 18, 2015

(65) Prior Publication Data
US 2016/0362023 A1    Dec. 15, 2016

(51) Int. Cl.
*F16K 31/00* (2006.01)
*B60N 2/02* (2006.01)
(Continued)

(52) U.S. Cl.
CPC ........ *B60N 2/0244* (2013.01); *A61H 9/0078* (2013.01); *A61H 23/04* (2013.01);
(Continued)

(58) Field of Classification Search
CPC .................................................. F16K 31/025
See application file for complete search history.

(56) References Cited

U.S. PATENT DOCUMENTS 2,299,404 A   10/1942   Newton
3,480,040 A   11/1969   Erickson
(Continued)

FOREIGN PATENT DOCUMENTS

CN    101725733 A    6/2010
DE    102 57 549 B3   8/2004
(Continued)

OTHER PUBLICATIONS

International Search Report for Application No. PCT/EP2013/076494 dated Sep. 16, 2014, 2 pages.
(Continued)

*Primary Examiner* — Umashankar Venkatesan
(74) *Attorney, Agent, or Firm* — Howard & Howard Attorneys PLLC

(57) ABSTRACT

The present invention is directed to a SMA valve for controlling air supply to an air cell in a vehicle seat, comprising a control unit arranged to open the valve in predetermined cycles, each cycle having predetermined activation start and stop times, by supplying an electrical activation power to a SMA wire which in turn acts on a valve element to open the valve for each cycle when the SMA wire shortens upon reaching the threshold temperature, and a temperature sensor for sensing the ambient temperature around the SMA wire. According to the invention the control unit is arranged to receive the temperature signal from the temperature sensor and to determine an activation delay time and an deactivation delay time in dependence on the temperature sensed by the temperature sensor, and to correct the activation start time and the activation stop time for the activation delay time and the deactivation delay time, respectively, to provide a corrected activation start time and a corrected activation stop time to be used for the next cycle.

9 Claims, 4 Drawing Sheets

(51) Int. Cl.
*B60N 2/90* (2018.01)
*A61H 9/00* (2006.01)
*F16K 31/02* (2006.01)
*B60N 2/66* (2006.01)
*A61H 23/04* (2006.01)
*F03G 7/06* (2006.01)
*G05D 7/06* (2006.01)

(52) U.S. Cl.
CPC ............ *B60N 2/665* (2015.04); *B60N 2/914* (2018.02); *B60N 2/976* (2018.02); *F03G 7/065* (2013.01); *F16K 31/025* (2013.01); *G05D 7/0635* (2013.01); *A61H 2201/0149* (2013.01); *A61H 2201/1633* (2013.01); *A61H 2201/5002* (2013.01); *A61H 2201/5007* (2013.01); *A61H 2201/5064* (2013.01); *A61H 2201/5071* (2013.01); *A61H 2201/5082* (2013.01); *A61H 2201/5092* (2013.01); *A61H 2203/0425* (2013.01); *B60N 2002/026* (2013.01); *B60N 2002/0268* (2013.01)

(56) References Cited

U.S. PATENT DOCUMENTS

| | | | |
|---|---|---|---|
| 4,429,552 | A | 2/1984 | Reedy |
| 4,570,851 | A | 2/1986 | Cirillo |
| 4,655,505 | A * | 4/1987 | Kashiwamura ........ A47C 7/467 297/284.6 |
| 4,840,425 | A * | 6/1989 | Noble ..................... A47C 7/467 297/284.1 |
| 4,973,024 | A | 11/1990 | Homma |
| 5,127,708 | A * | 7/1992 | Kishi ....................... A61B 5/18 297/284.1 |
| 5,135,282 | A * | 8/1992 | Pappers ............... B60N 2/4415 297/284.3 |
| 5,345,963 | A | 9/1994 | Dietiker |
| 5,622,482 | A | 4/1997 | Lee |
| 5,669,416 | A | 9/1997 | Nusche |
| 5,787,947 | A | 8/1998 | Hertsgaard |
| 6,024,545 | A | 2/2000 | Morioka |
| 6,123,320 | A | 9/2000 | Rasanow et al. |
| 6,220,667 | B1 * | 4/2001 | Wagner .................. B60N 2/002 297/284.6 |
| 6,276,385 | B1 * | 8/2001 | Gassman ............... G05B 19/19 137/1 |
| 6,449,434 | B1 | 9/2002 | Fuss |
| 6,464,200 | B1 | 10/2002 | Hines et al. |
| 6,494,225 | B1 | 12/2002 | Olewicz et al. |
| 6,564,824 | B2 * | 5/2003 | Lowery ................ G05D 7/0635 137/48 |
| 6,972,659 | B2 | 12/2005 | Von Behrens et al. |
| 7,093,817 | B2 | 8/2006 | MacGregor et al. |
| 7,331,563 | B2 | 2/2008 | Biehl et al. |
| 7,363,942 | B2 | 4/2008 | Fernandez |
| 7,484,528 | B2 * | 2/2009 | Beyerlein ............. F16K 31/002 137/596 |
| 7,663,811 | B2 | 2/2010 | Noda et al. |
| 7,748,405 | B2 | 7/2010 | Ghorbal et al. |
| 7,911,332 | B2 | 3/2011 | Caretta et al. |
| 8,127,543 | B2 | 3/2012 | Von Behrens et al. |
| 8,382,460 | B2 | 2/2013 | Ramunas et al. |
| 8,570,384 | B2 | 10/2013 | Brown et al. |
| 8,714,199 | B2 | 5/2014 | Deperraz et al. |
| 9,027,903 | B2 | 5/2015 | Arekar et al. |
| 9,462,928 | B2 | 10/2016 | Marone et al. |
| 9,630,560 | B2 | 4/2017 | Alacqua et al. |
| 2001/0011414 | A1 | 8/2001 | Antonio et al. |
| 2005/0121636 | A1 | 6/2005 | Scott |
| 2007/0023089 | A1 | 2/2007 | Beyerlein et al. |
| 2007/0166170 | A1 | 7/2007 | Nason et al. |
| 2007/0246285 | A1 | 10/2007 | Browne et al. |
| 2008/0018198 | A1 | 1/2008 | Sohn et al. |
| 2008/0251746 | A1 | 10/2008 | Riley et al. |
| 2008/0254346 | A1 | 10/2008 | Burstall et al. |
| 2008/0271559 | A1 | 11/2008 | Garscha |
| 2010/0111733 | A1 | 5/2010 | Ramunas et al. |
| 2010/0222733 | A1 | 9/2010 | Schieber et al. |
| 2010/0332035 | A1 * | 12/2010 | Gao ......................... G05B 9/02 700/275 |
| 2011/0039967 | A1 | 2/2011 | Wilson et al. |
| 2011/0166524 | A1 | 7/2011 | Preuthun et al. |
| 2012/0011843 | A1 | 1/2012 | Makinson et al. |
| 2012/0002113 | A1 | 2/2012 | Stadelbauer et al. |
| 2012/0025113 | A1 * | 2/2012 | Stadelbauer .......... F16K 31/002 251/11 |
| 2012/0067430 | A1 | 3/2012 | Deperraz et al. |
| 2012/0153043 | A1 | 6/2012 | Arekar et al. |
| 2012/0160334 | A1 | 6/2012 | Deperraz et al. |
| 2012/0199768 | A1 | 8/2012 | Love et al. |
| 2012/0223554 | A1 | 9/2012 | Lem et al. |
| 2013/0002933 | A1 | 1/2013 | Topliss |
| 2013/0162896 | A1 | 6/2013 | Kang et al. |
| 2013/0277580 | A1 | 10/2013 | Deperraz |
| 2014/0060858 | A1 | 3/2014 | Johnson |
| 2014/0125042 | A1 | 5/2014 | Köpfer |
| 2015/0202993 | A1 | 7/2015 | Mankame et al. |
| 2016/0018016 | A1 | 1/2016 | Dankbaar et al. |

FOREIGN PATENT DOCUMENTS

| | | |
|---|---|---|
| DE | 10 2005 060 217 A1 | 7/2006 |
| DE | 10 2008 021 444 A1 | 11/2009 |
| EP | 2 078 891 A2 | 7/2009 |
| EP | 2 239 486 B1 | 10/2011 |
| EP | 2 312 187 B1 | 11/2012 |
| JP | S 62-167981 U | 10/1987 |
| JP | H07 71628 A | 3/1995 |
| JP | 2006-037786 A | 2/2006 |
| WO | WO 01/33306 A2 | 5/2001 |
| WO | WO 2007/030417 A2 | 3/2007 |
| WO | WO 2015/086088 A1 | 6/2015 |
| WO | WO 2015/086089 A1 | 6/2015 |
| WO | WO 2015/185132 A1 | 12/2015 |

OTHER PUBLICATIONS

International Search Report for Application No. PCT/EP2013/076507 dated Sep. 16, 2014, 4 pages.
International Search Report for Application No. PCT/EP2014/061614 dated Jan. 30, 2015, 4 pages.
English language abstract and computer-generated English translation for DE 102 57 549 B3 extracted from espacenet.com database on Nov. 15, 2016, 15 pages.
English language abstract and computer-generated English translation for DE 10 2005 060 217 A1 extracted from espacenet.com database on Nov. 15, 2016, 12 pages.
English language abstract and computer-generated English translation for DE 10 2008 021 444 A1 extracted from espacenet.com database on Nov. 15, 2016, 11 pages.
Computer-generated English language translation for JPS 62-167981 U extracted from PAJ database on Nov. 15, 2016, 3 pages.
International Search Report for International Application No. PCT/EP2013/076593 dated Oct. 2, 2014; 3 pages.
English language abstract and computer-generated translation of Japanese Publication No. JP H07 71628 A extracted from www.espacenet.com on Aug. 15, 2017; 7 pages.
English language abstract and machine-assisted English language translation of Japanese Publication JP 2006-037786 A extracted from www.espacenet.com on Aug. 15, 2017; 8 pages.
English language abstract and computer-generated translation of Chinese Publication No. CN 101725733 A extracted from www.espacenet.com on Aug. 15, 2017; 5 pages.
English language abstract and machine-assisted English language translation of European Patent No. EP 2 312 187 A1 extracted from www.espacenet.com on Dec. 21, 2015; 11 pages.
International Search Report for International Patent Application No. PCT/IB2013/000307 dated Nov. 11, 2013; 4 pages.

(56) References Cited

OTHER PUBLICATIONS

Shkolnikov, Viktor, Ramunas, John, and Santiago, Juan G., "A Self-priming, roller-free, miniature, peristaltic pump operable with a single, reciprocating actuator", *Sens Actuators A Phys*. May 2010 ; 160(1-2): 141-146, doi:10.1016/j.sna.2010.04.018, © 2010 Elsevier B.V.; 16 pages.

Website: http://www.takasago-fluidics.com/products_valve/others/SMV/, Shape Memory Alloy Valve SMV Series, Jul. 9, 2014; 2 pages.

English language translation of JP S62 167981 U provided on Oct. 26, 2017, and certified by Morningside IP on Dec. 11, 2017, which was previously cited in a first Information Disclosure Statement on Nov. 4, 2016; 8 pages.

\* cited by examiner

SMA VALVE FOR CONTROLLING AIR SUPPLY TO AN AIR CELL IN A VEHICLE SEAT

RELATED APPLICATIONS

This application is the National Stage of International Patent Application No. PCT/EP2013/076593, filed Dec. 13, 2013, the entire contents of which are hereby incorporated by reference.

The present invention relates to a SMA valve for controlling air supply to an air cell in a vehicle seat, comprising a control unit arranged to open the valve in predetermined cycles, each cycle having predetermined activation start and stop times, by supplying an electrical activation power to a SMA wire which in turn acts on a valve element to open the valve for each cycle when the SMA wire shortens upon reaching the threshold temperature, and a temperature sensor for sensing the ambient temperature around the SMA wire.

Drivers and passengers of motor vehicles, especially when driving long distances, often experience discomforts caused by long time static posture when seated in a vehicle seat. This is not only felt as being uncomfortable and causing for example back pain but may also lead to permanent impairment of health, in particular for professional drivers such as taxi, truck and bus drivers. To provide a remedy the automotive industry since some time offers vehicle seats with adjustable lumbar air supports and bolsters and with integrated massage systems in the seat back. The lumbar supports and bolsters in the seat are adjusted by inflating air cells by inflating them with pressurized air and closing them in the desired state. In massage systems series of air cells are sequentially inflated and deflated to provide a massage effect.

Such a massage system for a vehicle seat is for example disclosed in U.S. Pat. No. 5,135,282 A. A series of inflatable air cells is disposed along the seat back close the inner surface of the seat back cover. A supply line structure is receiving compressed air from a pump and is supplying this compressed air to the air cells for sequentially inflating/deflating the series of air cells. For this purpose the supply line structure comprises a common supply line interconnecting the air cells in series, and an exhaust or venting line interconnecting the series of air cells, which venting line is capable of being opened to the environment for venting in order to deflate the air cells. In order to produce a propagating sequential inflation along said series of air cells starting form the first cell at the lower end of the seat back and continuing cell by cell to the last cell at the upper end of the seat back, a number of controllable valves and a control unit are provided. In principle there is a controllable valve upstream of each air cell to permit to control the inflation/deflation of each cell individually, and further valves for controlling venting. Since the number of air cells in a massage system is considerable, e.g. 24 air cells for one vehicle seat, the number of valves is correspondingly large.

Similarly, in vehicle seats having adjustable lumbar supports and bolsters valves are present to open the air cells for supplying pressurized air up to a desired pressure level, and for closing the air cells at the desired pressure level.

Solenoid valves are technically well suited to be utilized as controllable valves in massage systems and in lumbar support and bolster systems for vehicle seats. Typically solenoid valves of the normally closed type are employed in this field, wherein a plunger is urged by a spring so that a sealing surface of the plunger is pressed onto a valve seat to keep the valve in the closed state. By applying an electrical current to a solenoid of the valve the plunger is by electromagnetic action lifted off the valve seat against the bias force of the spring, and when the current supply is stopped by a control unit the plunger is immediately returned by the spring force to its sealing position. Solenoid valves can thus be operated by the control unit with precise timing which is of importance in seat massage systems where a desired sequence of inflation/deflation in a series of subsequent air cells has to be achieved. On the other hand, solenoid valves are relatively expensive, physically large and heavy so that alternative, simpler valve designs would be useful in particular for vehicle seat massage systems which utilize large numbers of valves.

Another type of controllable valve is the so-called SMA valve, wherein SMA stands for "shape memory alloy". A SMA valve comprises a housing, a plunger, a spring urging the plunger to a closed position, and an actuator capable of acting on the plunger such that the actuator upon activation exerts a force on the plunger which moves the plunger away from the valve seat to an open position and keeps it there as long as the actuator is activated. In this case the actuator comprises an element made of a shape memory alloy, typically a metal wire of such material or a small a narrow strip of such material. A SMA material changes its microscopic structure at a threshold temperature such that a SMA element shortens upon exceeding the threshold temperature. In particular, a SMA material at room temperature is in the state of a metal with martensitic properties, whereas the structure transitions at a threshold temperature of about 80° C. into an austenitic structure. Due to this transition a SMA wire shortens, wherein this shortening is utilized to provide the force acting on the plunger to move it to the opened position.

A SMA valve is for example described in DE 10 2005 060 217 A1. The disclosed SMA valve has a SMA wire which is fixed with its opposite ends to a printed circuit board mounted in a housing. In its central portion the SMA wire is spaced apart from the plane of the printed circuit board so that it has the shape of an inverse V, wherein the apex portion of the inverse V of the SMA wire is connected to the plunger. In order to activate the SMA wire to perform the transition an electrical current is supplied to the SMA wire to increase its temperature beyond the threshold temperature. The shortening of the SMA wire results in a force perpendicular to and directed to the printed circuit board so that the SMA wire pulls the plunger towards the printed circuit board and away from the valve seat.

Since in typical applications the diameter of the SMA wire is rather small, typically below 0.1 mm, care has to be taken to limit the electrical power supply to the SMA wire so that it exceeds the threshold temperature but stays well below temperatures at which the wire would melt. For this purpose a known SMA valve of the above-described type is further equipped with a temperature sensor to sense the ambient temperature around the SMA wire. Depending on the ambient temperature of the SMA wire it is then determined how much energy is needed to heat the SMA wire safely beyond its threshold temperature but to keep it well below melting temperatures. The appropriate electrical power supply at a given ambient temperature can for example be taken from a look-up table stored in the control unit, which look up table has for example been empirically determined for the particular type of SMA wire as present in the valve.

A disadvantage of SMA valves is that the timing of its activation is difficult to control. When a cycle of activation is started by supplying a specified electrical power to the SMA wire it takes some time until the SMA wire reaches the transition temperature and thus causes the transition to the activated state of the valve; this activation delay time varies in dependence on the ambient temperature. Likewise, when the activation cycle is terminated by stopping the supply of electrical power to the SMA wire, it takes some time until the SMA wire cools down below its threshold temperature by heat exchange. Of course this cool down time or deactivation delay time also depends on the ambient temperature, even to a considerably larger extent than the activation delay time.

For these reasons SMA valves are typically not utilized for massage systems since the required timing for the inflating/deflating cycles for the individual air cells could not be achieved. For applications as in lumbar supports or bolsters of vehicle seats the timing aspect is less critical. However, in these applications it can be irritating when the passenger for example actuates a lumbar support to deflate it and the actual deflation does not start immediately which could induce repeated further actuation when the passenger has the impression that the first actuation attempt failed.

It is an object of the present invention to provide SMA valves and a method for controlling a SMA valve with improved control characteristics in the form of reduced activation delay and deactivation delay times which makes them suitable for applications in pneumatic vehicle seat massage systems and lumbar support and bolsters for vehicle seats.

This object is achieved by a SMA valve comprising the features of claim 1 and by a method comprising the features of claim 7. Preferred embodiments of the invention are set out in the dependent claims.

According to the present invention the control unit of the SMA valve is arranged to use the temperature signal received from the temperature sensor and to determine an activation delay time and a deactivation delay time in dependence on the temperature sensed by the temperature sensor. The temperature dependence of the delay times can for a particular type of SMA valve be determined in advance empirically by repeated measurements of the delay times while varying the ambient temperature. The time dependence can for example be stored in the form of look-up tables which associate a temperature with an activation delay time and an deactivation delay time. In practice a temperature range of practically relevant temperatures could be divided in a number of temperature intervals of for example 1° C. width, and for each interval an associated average activation delay time and an average deactivation delay time are stored in the look-up tables. Alternatively functions could be fitted to the empirical data of the activation and deactivation delay times in dependence on the temperature, and the fitted function parameters could be used by the control unit to calculate an activation delay time and a deactivation delay time by applying the inverse functions to the presently measured particular temperature.

The control unit is then further arranged to correct the activation start time for the activation delay time and to correct the activation stop time for deactivation delay time to provide corrected activation start and stop times to be used for the next cycle. The corrections can for example be done by deducing the activation delay time and the deactivation delay time from the activation start time and the activation stop time, respectively. In this manner the effects of temperature dependent delay times of the operation of SMA valves are substantially reduced.

In a preferred embodiment of the invention the timing control of the operation of the SMA valves is further improved. In this embodiment the SMA valve is provided with a sensing means which senses the activation and deactivation of the SMA valve by determining the opening time when the valve reaches the open state and the closing time when the valve starts to transition from the open to the closed state. The control unit is further arranged to compare for a presently completed cycle the activation start time and the activation stop time with the actual opening time and the actual closing time determined by the sensing means, and to, if any deviations are found, further correct the corrected activation start time and the corrected activation stop time for the next cycle for the deviations found in the present cycle. In this manner actual deviations of the SMA valve in a present situation from the average temperature dependence behavior of this type of SMA valve can be individually compensated for. Systematic deviations may for example occur in dependence on other environmental conditions than temperature, as for example humidity, air flow etc.

In a preferred embodiment the sensing means is a pressure sensor sensing the pressure on the output side of the SMA valve which corresponds to the pressure in the air cell, wherein the control unit is arranged to analyze the time dependent pressure sensor signal to determine the opening and closing times of the valve. The opening time can for example be determined as the time when a rising edge in the pressure signal can be identified. The closing time can be determined by the control unit by identifying constant or zero slope times in the pressure signal.

In a preferred alternative embodiment the sensing means is arranged for detecting a position of the valve element indicating that the valve element has reached the open position. Such sensing means can for example be provided by a conductor arranged on the valve element which is arranged to close an electric circuit when the valve element is in the opened position which closed circuit is detected by the control unit; alternatively such sensing means can be provided by a magnetic sensor sensing the presence of the valve element in the opened position, or alternatively by a light barrier detecting the valve element in its opened position.

In a further aspect the present invention is directed to a support or massage system for a vehicle seat comprising a plurality of air cells and a plurality of valves to control air flow to the air cells. In this system at least one SMA valve including a sensing means for sensing the actual activation and deactivation of the SMA valve is present which allows to determine an opening time when the valve reaches the open state and a closing time when the valves starts to transition to the closed state. At least one of the other SMA cells in the system is a dependent SMA valve which is not provided with such sensing means, wherein the SMA valve including the sensing means is arranged to communicate the determined opening and closing times, and wherein the at least one dependent SMA valve is arranged to receive that opening and closing times, wherein control unit of the at least one dependent SMA valve is further arranged to compare for a presently completed cycle the activation start time and the activation stop time with the received opening time and the received closing time from the at least one other SMA valve including a sensing means and to, if any deviations are found, further correct the corrected activation start time and the corrected activation stop time for the next cycle for the deviations found the present cycle. This arrangement is based on the consideration that in a massage system with SMA valves which are located close to each other in a vehicle seat the environmental conditions which might influence the timing behavior of the SMA valves are very similar for all valves of the same system. Therefore, it can be sufficient to determine the actual opening time and actual closing time for one valve only and to communicate these times to all other valves to use them in their further correction of the corrected activation start time and the corrected activation stop time. In such arrangement the sensing means are in principle only needed for one of the SMA valves, wherein the remaining SMA valves can be of simpler design without such sensing means.

The invention will in the following be described in more detail in connection with the drawings in which.

Figure 1:
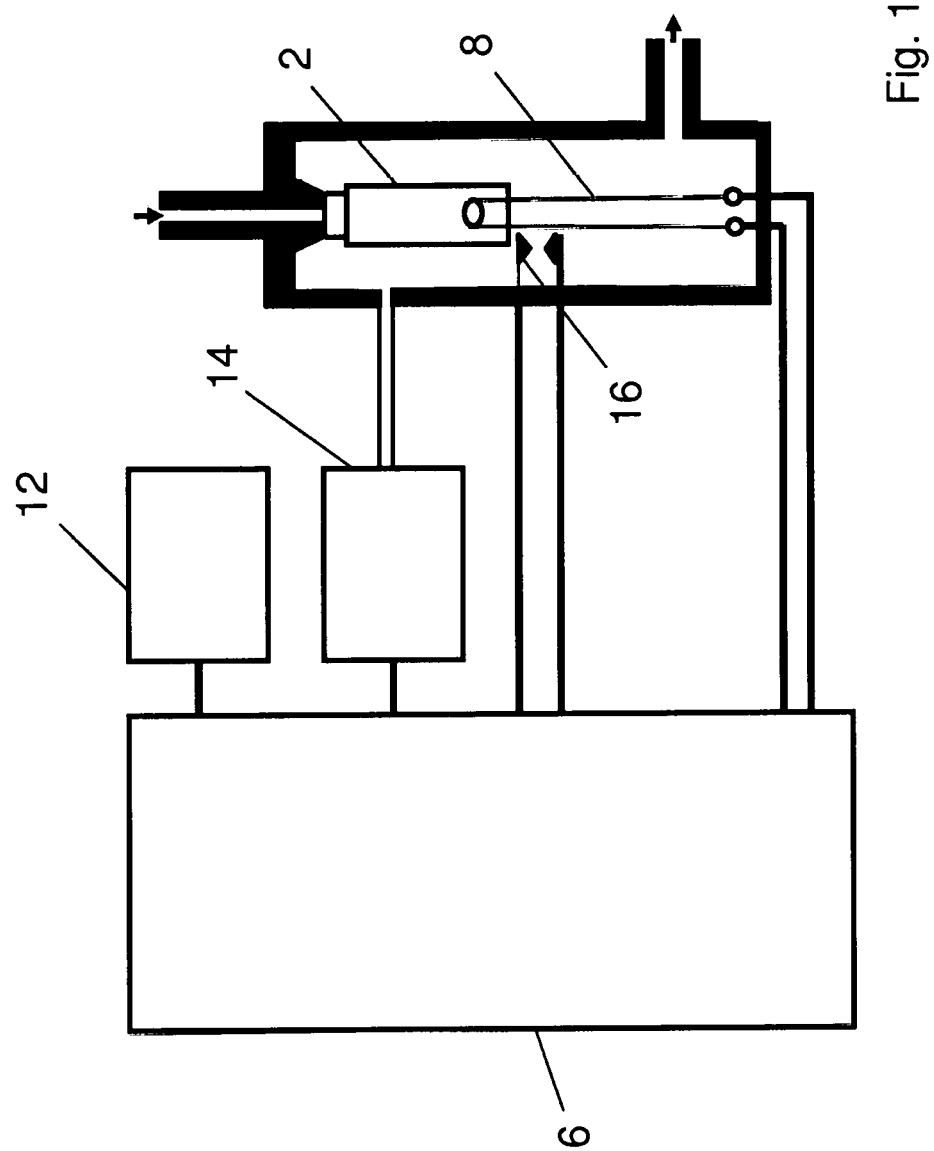
FIG. 1 shows a schematic block diagram of a SMA valve according to the invention.

FIG. 1 shows a schematic block diagram of some of the important components of a SMA valve according to the invention. The SMA valve has a housing in which a valve element 2 in the form of a plunger is disposed. This valve element 2 has a sealing tip portion which in the closed position of the valve element 2 abuts against a valve seat which is located at the end of a valve port inside of the valve housing. At the outer end of this valve port an incoming arrow indicates the supply of pressurized air. The valve element 2 is biased by a spring element (not shown) to the closed state shown in which the sealing tip portion of the valve element 2 closes the valve port.

The SMA valve further comprises a control unit 6 combined with electrical circuits for providing electrical power of an adjustable level to a SMA wire 8. The SMA wire 8 is with two opposite end portions fixed with respect to the housing of the valve. The central portion of the SMA wire 8 is in engagement with the plunger. It is to be noted that the curved path along which the SMA wire 8 is extending in FIG. 1 is schematical only and intended to indicate that a shortening of the SMA wire 8 would result in a force retracting the valve element 2 from its closed state.

In order to open the valve for incoming pressurized air the control unit 2 controls electric circuits to provide a electrical activation power for the SMA wire 8. Due to its resistance heat is generated in the SMA wire 8 by the activation power and the temperature is increased beyond the threshold temperature so that SMA wire 8 pulls valve element 2 away from the valve seat to bring the valve to the open state in which pressurized air flows in and is further flows through the outgoing port to a connected air cell (not shown). At the end of the predetermined cycle the control unit 8 terminates supply of electrical activation power to SMA wire 8 which in turn cools down below the threshold temperature. Thereafter, the bias force of the spring element (not shown) brings the valve to the closed state again.

The SMA valve shown in FIG. 1 further comprises a temperature sensor 12, a pressure sensor 14 and a position sensor 16. The functions of these sensors will be described below. In principle it would be desirable to measure the temperature of the SMA wire itself directly. However, for practical reasons it is only possible to measure the air temperature in close proximity around the SMA wire. The reason is that the SMA wire has a very small diameter, as indicated above, and therefore has a very low heat capacity. A temperature sensor in heat conducting contact with the wire would cause a heat flow from the small diameter wire to the temperature sensor which would locally cool down the wire which would lead to undesired effects and inaccurate temperature readings.

Figure 2:
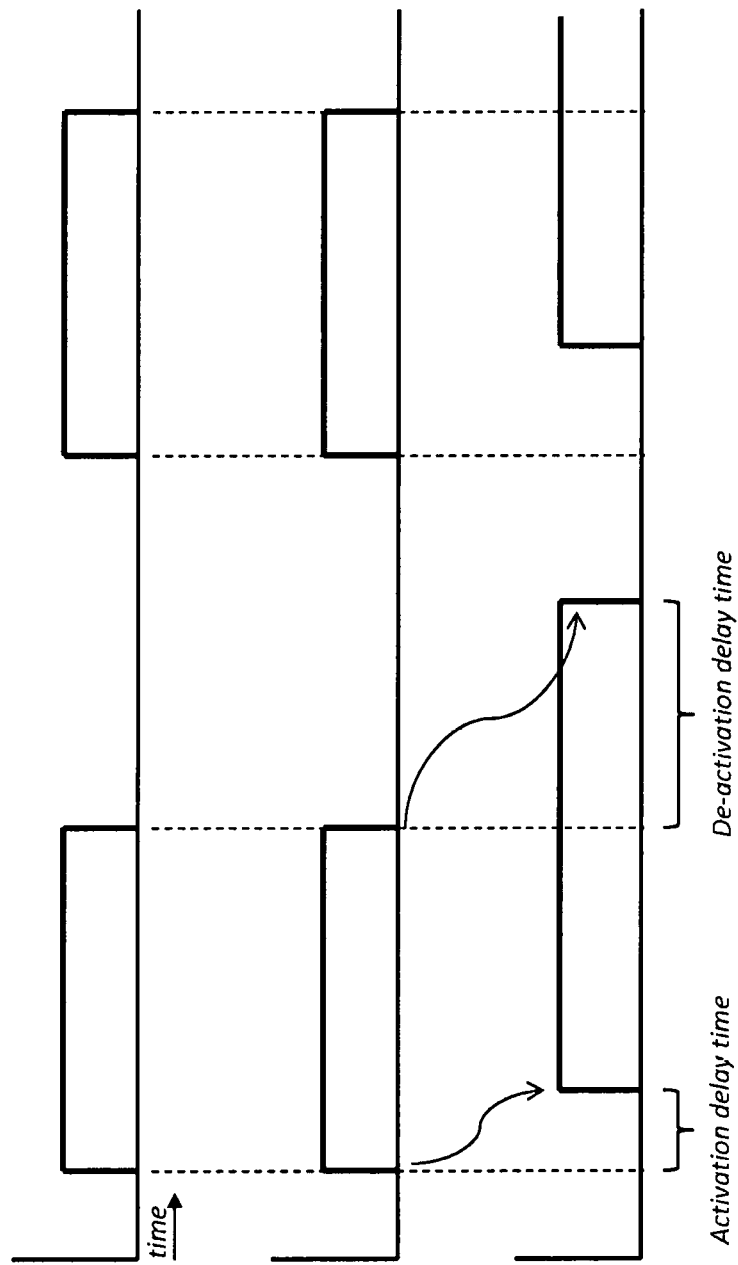
FIG. 2 shows graphs as a function of time illustrating the activation and deactivation delay times for conventional SMA valves.

FIG. 2 illustrates the operation of a conventional SMA valve. The uppermost graph shows the desired cycle timing with two subsequent rectangular pulses, wherein the rectangular pulses indicate the desired activated states of the valve in which the valve is indented to be in the open state, whereas at times outside the rectangular pulses the valve is intended to be in the closed state.

The graph in the middle illustrates the time dependence of electrical activation of the SMA wire of a conventional SMA valve. It is noted that the rectangular pulse shape is schematical only; the electrical power level may change over a cycle, in particular it is preferred to start with a rather high level to rapidly heat up the wire, and then to reduce the level of supplied electrical power in order to avoid overheating.

The lower graph shows the state of the SMA valve as a function of time, wherein the rectangular pulses indicate the phases in which the SMA valve is open. As can be seen from FIG. 2 there is an activation delay time between the rising edge of the electrical activation and the opening time of the SMA valve because this activation delay time is needed to heat up the SMA wire by the electrical activation power to exceed the threshold temperature. It is clear that such activation delay time depends on the ambient temperature (and possibly on the history of activation of the SMA wire). For example, in winter the temperature in the vehicle may be at −20° C. when the car is started. When the passenger cabin is heated up to e.g. +20° C. the timing for the activation delay time has changed. This applies even more for the deactivation delay time which is, as indicated in FIG. 2, the delay time between the falling edge of the activation signal and the actual closing of the valve. This deactivation delay time is the cooling time needed to let the SMA wire cool down from above the threshold temperature to a temperature below the threshold temperature by heat exchange with the environment. Of course the rate of the heat exchange is dependent on the temperature difference between the wire and the environment. Therefore the deactivation delay time is even more critically dependent on the temperature than the activation delay time.

For a given type of a SMA valve one can measure the activation delay time and the deactivation delay time while varying the ambient temperature from measurement to measurement over an intended measurement range. The time dependence of the activation delay time and the deactivation delay time can be recorded for example in the form look-up tables which associate each temperature with an activation delay time and a deactivation delay time. For example, a desired measurement range from minus 20° C. to plus 80° C. can be divided in 100 intervals of 1° C. width. All temperatures within one step of 1° C. width are associated with the same average activation delay time and the same average deactivation delay time which were predetermined empirically. In this manner look-up tables with 100 temperature values and corresponding activation delay times and deactivation delay times can be generated and stored in the control unit. A temperature measured by temperature sensor 12 is then assigned to the best fitting temperature interval, and the corresponding activation delay time and deactivation delay time are retrieved by the control unit from the look-up table. The control unit can then correct the activation start time and the activation stop time of the next cycle for the determined activation delay time and the determined deactivation delay time to provide corrected activation start and stop times to be used for the next cycle. This already greatly reduces the effects of activation delay and deactivation delay times.

Figure 3:
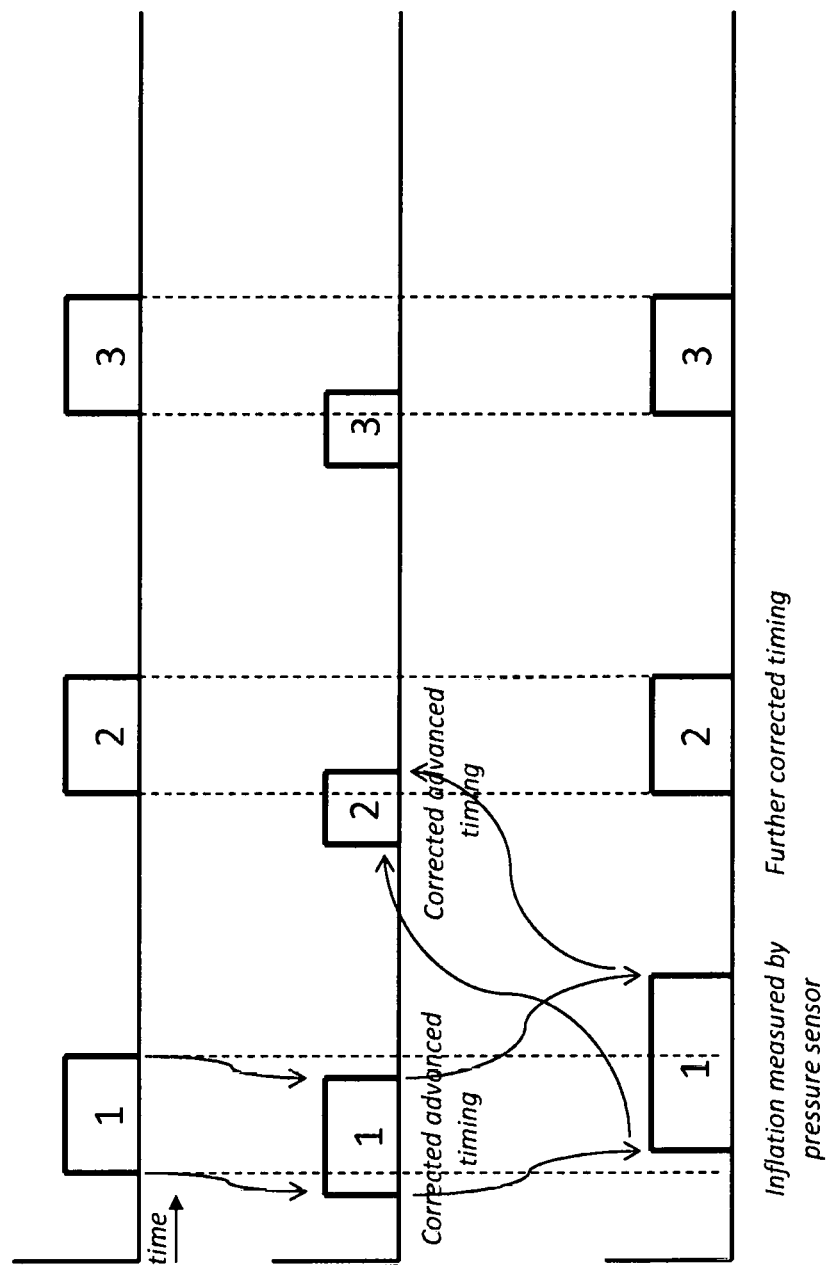
FIG. 3 shows graphs illustrating the valve operation in dependence on time with an adaptive correction of the timing signals for the SMA valve according to an embodiment of the present invention.

In a preferred embodiment, however, the timing control is further improved by applying an adaptive timing control. Due to other varying environmental effects which may also affect the activation delay time and the deactivation delay time, the corrected activation start time and the corrected activation stop time may still lead to an activation cycle of the SMA valve which deviates from the desired activation cycle. This is indicated in FIG. 3 in which in the upper graph the desired activation cycles of the SMA valve for three subsequent cycles are indicated by three subsequent activation pulses. The control unit then uses temperature depended predetermined activation delay times and deactivation delay times to correct the electrical activation cycles for the SMA wires for these delay times, for example by deducing the activation delay time from the activation start time and by deducing the deactivation delay time from the activation stop time to provide corrected activation start and stop times.

As indicated in the graph in the middle of FIG. 3 the actual cycles performed by the SMA valve as measured by the sensing means nevertheless deviate to a certain extent from the intended activation cycle shown in the upper graph despite of using the corrected activation start and stop times. Such deviations may be due to variations in the environment which also affect the activation delay time and the deactivation delay time. Further environmental influence factors of this kind may be the humidity and air flow which may affect the heat exchange between the SMA valve and the environment.

In this preferred embodiment of the invention it is now taken into account that the temperature corrected activations start and stop times may still lead to a deviation in the actual activation cycle of the SMA valve compared to the desired activation cycle. These deviations of the activation start time and the activation stop time from the desired activation start time and the desired activation stop time are determined in a just completed activation cycle. The control unit is now arranged to further correct the corrected activation start and stop times for the next cycle for these deviations, assuming the same deviations would occur in the next cycle if they would not be taken into account in the further corrected activation start times and stop times for the next cycle. This is indicated in FIG. 3 by the arrows from the first pulse in the lower graph of FIG. 3 which are intended to indicate that the deviations found in the actual actuation cycle of the SMA valve for the first cycle are transferred into a further correction for the corrected activation start time and stop time for the second cycle in the middle. Using this further correction for the deviations found in the first cycle results in a further corrected second cycle as shown in the lower graph of FIG. 3 which is now in good agreement with the desired activation cycle for the second cycle. Such adapted further correction of the activation start and stop times is very effective since it can be assumed that the environmental conditions which affect the timing do not rapidly change between subsequent cycles, but are instead essentially the same in a present cycle and in the next cycle so that the further correction for the deviations in a first cycle are still valid for a further correction in the second cycle. By such comparison of the actual activation start and stop times of the valve with the desired activation start and stop times it may for example be found that using the predetermined temperature dependent activation delay and deactivation delay times leads still to a deviation from the desired times, for example use of the corrected activation start and stop times may lead to an actual activation cycle which starts 1 sec too early and which ends 1.5 sec too early compared to the activation start time and the activation stop time. Then these deviations of 1 sec for the start time and 1.5 sec for the stop time may be used to further correct the temperature corrected activation start and stop times for the next cycle. This further correction is based on the assumption that without such further correction the same deviations would also be present in the next cycle. By using the further correction the timing control is adaptively adjusted to variations of the control characteristics over time.

Figure 4:
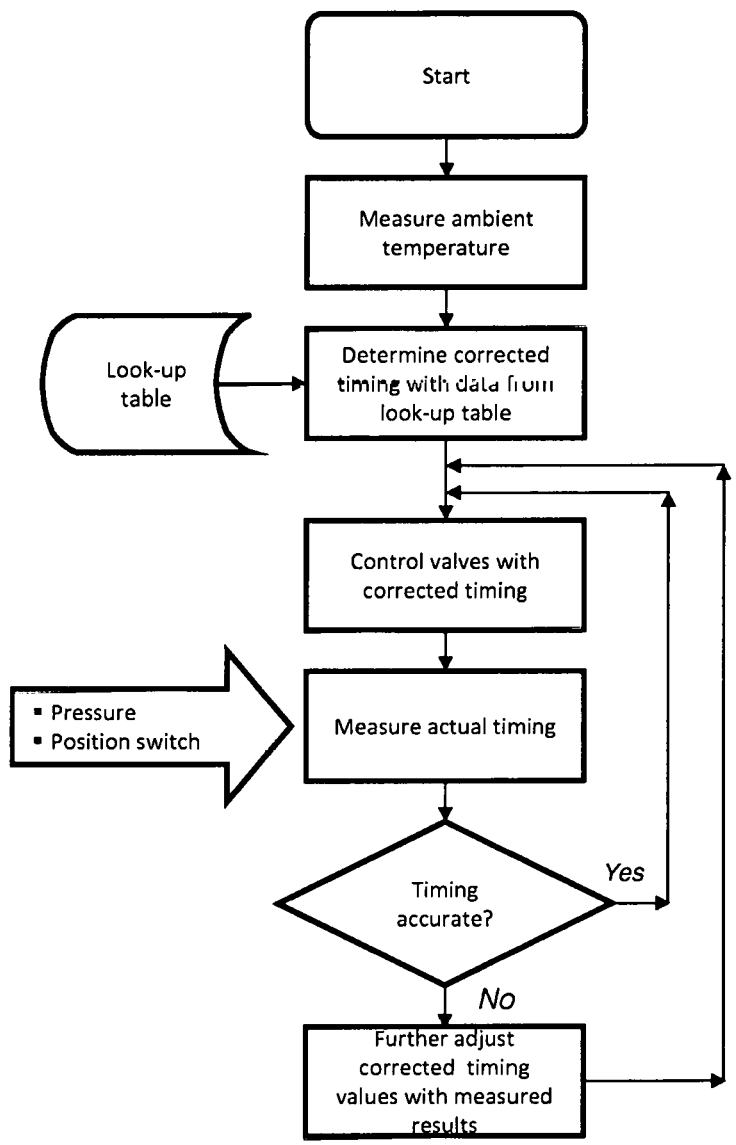
FIG. 4 shows a flow diagram illustrating the operation of the control unit of a SMA valve according to the preferred embodiment of the invention.

FIG. 4 shows a flow diagram illustrating the adaptive correction of the activation start and stop signals for the SMA valve in the preferred embodiment. As indicated the control unit receives a measurement of the ambient temperature and determines the associated activation delay time and the associated deactivation delay time expected for such temperature from a predetermined look-up table. The control unit determines corrected activation start and stop times by deducing the activation delay time from the activation start time and the deactivation delay time from the activation stop time. Then the SMA valve is operated with these corrected control signals. Thereafter the actual opening and closing of the SMA valve is detected and the opening and closing times are compared with the desired activation start and stop times. If any deviation in a presently completed cycle is found the corrected activation start time and the corrected activated stop time for the next cycle are further corrected for the deviations found between desired activation start and stop times and actual measured start and stop times of the valve in the presently completed cycle.

The invention claimed is:

1. An SMA valve for controlling air supply to an air cell in a vehicle seat, comprising;
    a housing defining an interior and a valve port fluidly coupled with the interior for directing the flow of the air between the air cell and the interior of housing,
    a control unit opening the SMA valve in predetermined cycles, with each cycle having predetermined activation start and stop times,
    a valve element,
    an SMA wire disposed within the interior of the housing and coupled to the valve element, with the control unit supplying an electrical activation power to the SMA wire which in turn acts on the valve element to open the valve for each cycle when the SMA wire shortens upon reaching a threshold temperature for permitting flow of the air between the air cell and the interior of housing, and
    a temperature sensor for sensing an ambient temperature within the interior of the housing around the SMA wire, wherein the control unit is arranged to receive a temperature signal from the temperature sensor and to determine an activation delay time and a deactivation delay time in dependence of the ambient temperature sensed by the temperature sensor, and to correct the activation start time and the activation stop time for the activation delay time and the deactivation delay time, respectively, to provide a corrected activation start time and a corrected activation stop time to be used for a next cycle of the control unit.

2. The SMA valve according to claim 1, further including a sensor which senses the activation and deactivation of the SMA valve to determine an opening time when the valve reaches an open state and a closing time when the valve starts to transition to a closed state, and in that the control unit is further arranged to compare for a presently completed cycle the activation start time and the activation stop time with the opening time and the closing time determined by the sensor and to further correct the corrected activation start time and the corrected activation stop time for the next cycle for a deviation found in the present cycle.

3. The SMA valve according to claim 2, wherein the sensor is a pressure sensor sensing a pressure on an output side of the SMA valve which corresponds to a pressure in the air cell, wherein the control unit is arranged to analyze the time dependent sensor signal to determine the opening and closing times of the valve.

4. The SMA valve according to claim 2, wherein the sensor detects a position of the valve element for indicating if the valve element is in the closed state position.

5. The SMA valve according to claim 4, further including a conductor mounted to the valve element, and wherein the sensor detects the valve element in the opened position by the conductor which closes an electric circuit when the valve element is in the opened position, by at least one of a magnetic sensor sensing the presence of the valve element in the opened position and a light barrier detecting the valve element in its opened position.

6. A support or massage system for a vehicle seat, comprising a plurality of air cells and a plurality of valves to control air flow to the air cells, wherein the plurality of air cells includes at least one SMA valve according to claim 2 and at least one dependent SMA valve without a sensor for sensing the activation and deactivation of the SMA valve, wherein the at least SMA valve according to claim 2 is able to communicate the opening time and the closing time to the at least one dependent SMA valve, and wherein the control unit of the at least one dependent SMA valve is arranged to compare the activation start time and the activation stop time of a presently completed cycle with the opening time and the closing time received for the presently completed cycle, and to further correct the corrected activation start time and the corrected activation stop time for the next cycle for a deviation found in the present cycle.

7. A method for controlling a SMA valve for controlling air supply to an air cell in a vehicle seat according to predetermined cycles in which the SMA valve is opened to supply air to air cell, each cycle having an activation start and an activation stop time, by supplying an electrical activation power to a SMA wire of the SMA valve which in turn acts on a valve element to open the valve for each cycle, with the SMA valve comprising a housing defining an interior and a valve port fluidly coupled with the interior for directing the flow of the air between the air cell and the interior of housing, with the SMA wire disposed within the interior of the housing and coupled to the valve element, with the method comprising the steps of:
    measuring an ambient temperature within the interior of the housing around the SMA wire with a temperature sensor,
    retrieving a predetermined activation delay time and a predetermined deactivation delay time in dependence on a temperature sensed by the temperature sensor,
    correcting the activation start time and the activation stop time for the retrieved activation delay time and the retrieved deactivation delay time to provide corrected activation start and stop times, and
    supplying the electrical activation power using the corrected activation start and stop times for the next cycle.

8. The method according to claim 7 further including the steps of:
    sensing the actual activation and deactivation of the SMA valve to determine an opening time when the valve reaches an open state and a closing time when the valve starts to transition to a closed state,
    comparing for a presently completed cycle the activation start time and the activation stop time with the opening time and the closing time, respectively and, further correcting the corrected activation start time and the corrected activation stop time of the next cycle for a deviation found in the present cycle.

9. An SMA valve for controlling air supply to an air cell in a vehicle seat, comprising;
    a control unit opening the SMA valve in predetermined cycles, with each cycle having predetermined activation start and stop times,
    a valve element,
    an SMA wire coupled to the valve element, with the control unit supplying an electrical activation power to the SMA wire which in turn acts on the valve element to open the valve for each cycle when the SMA wire shortens upon reaching a threshold temperature,
    a temperature sensor for sensing an ambient temperature around the SMA wire,
    wherein the control unit is arranged to receive a temperature signal from the temperature sensor and to determine an activation delay time and a deactivation delay time in dependence of the ambient temperature sensed by the temperature sensor, and to correct the activation start time and the activation stop time for the activation delay time and the deactivation delay time, respectively, to provide a corrected activation start time and a corrected activation stop time to be used for a next cycle of the control unit,
    a sensor which senses the activation and deactivation of the SMA valve to determine an opening time when the valve reaches an open state and a closing time when the valve starts to transition to a closed state, and in that the control unit is further arranged to compare for a presently completed cycle the activation start time and the activation stop time with the opening time and the closing time determined by the sensor and to further correct the corrected activation start time and the corrected activation stop time for the next cycle for a deviation found in the present cycle,
    wherein the sensor detects a position of the valve element for indicating if the valve element is in the closed state position, and
    a conductor mounted to the valve element, and wherein the sensor detects the valve element in the opened position by the conductor which closes an electric circuit when the valve element is in the opened position, by at least one of a magnetic sensor sensing the presence of the valve element in the opened position and a light barrier detecting the valve element in its opened position.

\* \* \* \* \*